US011176316B1

(12) United States Patent
Ng

(10) Patent No.: US 11,176,316 B1
(45) Date of Patent: Nov. 16, 2021

(54) FOCUSED SCREEN DATA FIELD PRESENTATION FOR ENTRY OF DATA ASSOCIATED WITH AN ELECTRONIC FORM INTO A QUICK ENTRY SYSTEM

(71) Applicant: Nicholas Ng, Torrance, CA (US)

(72) Inventor: Nicholas Ng, Torrance, CA (US)

( * ) Notice: Subject to any disclaimer, the term of this patent is extended or adjusted under 35 U.S.C. 154(b) by 0 days.

(21) Appl. No.: 16/204,005

(22) Filed: Nov. 29, 2018

(51) Int. Cl.
*G06F 17/00* (2019.01)
*G06F 40/174* (2020.01)
*G06F 3/0484* (2013.01)
*G06F 16/34* (2019.01)

(52) U.S. Cl.
CPC .......... *G06F 40/174* (2020.01); *G06F 3/0484* (2013.01); *G06F 16/34* (2019.01)

(58) Field of Classification Search
CPC ....... G06F 40/174; G06F 16/34; G06F 3/0484
USPC ....................................... 715/200, 224, 221
See application file for complete search history.

(56) References Cited

U.S. PATENT DOCUMENTS

| | | | | |
|---|---|---|---|---|
| 8,977,951 | B2* | 3/2015 | Ethier | G06F 40/174 715/222 |
| 2008/0215976 | A1* | 9/2008 | Bierner | G06F 40/174 715/708 |
| 2014/0279573 | A1* | 9/2014 | Coats | G06Q 30/0278 705/306 |
| 2015/0039989 | A1* | 2/2015 | Dhanawat | G06F 40/174 715/226 |

OTHER PUBLICATIONS

Hancock Carl, Gravity Forms Introduces Partial Entries Add-On, Published Mar. 29, 2018, Gravityforms.com, pp. 1-6 (pdf).*

* cited by examiner

*Primary Examiner* — Manglesh M Patel
(74) *Attorney, Agent, or Firm* — RC Trademark Company

(57) ABSTRACT

A focused screen data field presentation system and a focused screen data field presentation method are disclosed for entry of data associated with an electronic form into a quick entry system (CUES). The focused screen data field presentation system supports and the focused screen data field presentation d provides an efficient and effect manner of form entry that supersedes existing conventional electronic form systems and old traditional methods of form entry for websites, mobile devices, computers, and other electronic systems.

19 Claims, 7 Drawing Sheets

FIG. 5A

FOCUSED SCREEN DATA FIELD PRESENTATION FOR ENTRY OF DATA ASSOCIATED WITH AN ELECTRONIC FORM INTO A QUICK ENTRY SYSTEM

BACKGROUND

Embodiments of the invention described in this specification relate generally to data entry, and more particularly, to a focused screen data field presentation system and a focused screen data field presentation method for entry of data associated with an electronic form into a quick entry system (QES).

Form data has traditionally been presented in paper format for people to fill out manually. Electronic devices allow for such forms to be presented electronically on screens, with the devices receiving user input by some input device, such as a keyboard, on-screen keyboard, etc. However, forms are typically presented in inefficient and cumbersome ways for users of electronic devices. The inefficient form entry methods that exist presently for software driven applications on electronic devices is a problem for users.

Specifically, all of the existing conventional electronic form systems are based on an old method of displaying entry forms. It is basically placing "a tax tiling" type form that lays out fields of entry based on paper and pen design, with no deviation from the paper design.

Therefore, what is needed is a way to improve the delivery and usability of presently inefficient form entry methods when using software driven applications on electronic devices.

BRIEF DESCRIPTION

A novel focused screen data field presentation system and a focused screen data field presentation method are disclosed for entry of data associated with an electronic form into a quick entry system (QES). In some embodiments, the focused screen data field presentation system supports and the focused screen data field presentation method provides an efficient and effect manner of form entry that supersedes existing conventional electronic form systems and old traditional methods of form entry (which rely on their traditional form layout and design) for websites, mobile devices, computers, and other electronic systems.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
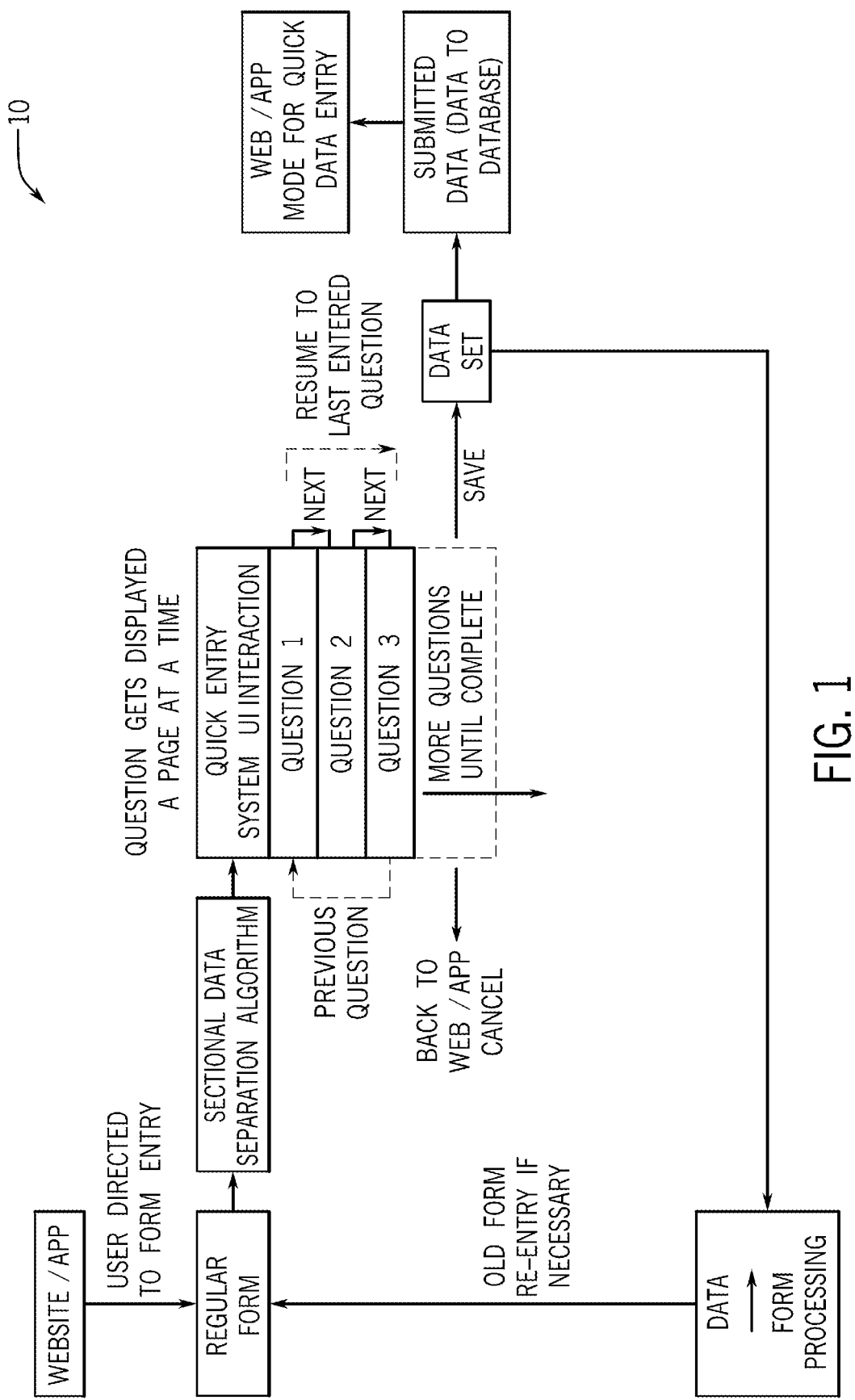
FIG. 1 conceptually illustrates a block diagram of a focused screen data field presentation system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel focused screen data field presentation system and a focused screen data field presentation method for entry of data associated with an electronic form into a quick entry system (QES). In some embodiments, the focused screen data field presentation system supports and the focused screen data field presentation method provides an efficient and effect manner of form entry that supersedes existing conventional electronic form systems and old traditional methods of form entry (which rely on their traditional form layout and design) for websites, mobile devices, computers, and other electronic systems.

As stated above, data entry forms are typically presented in inefficient and cumbersome ways for users of electronic devices. The inefficient form entry methods that exist presently for software driven applications on electronic devices are problematic for users because they tend to be based on old methods of displaying entry forms, e.g., just laying out fields of entry based on paper and pen design, with no deviation from the paper design. This makes display of entry forms a problem, especially for small form factor devices, such as smartphones and smaller tablet computing devices. Embodiments of the focused screen data field presentation system and method for entry of data associated with an electronic form into a QES described in this specification solve such problems by streamlining the data entry process that effectively replaces the old outdated method of form entry on non-touch screens. Some of the process includes replacing how action button flows, calling/minimizing areas of entry, and creating a quick field maneuvering for the user to effectively focus on completing the form.

Embodiments of the focused screen data field presentation system and method for entry of data associated with an electronic form into a QES described in this specification differ from and improve upon currently existing options. In particular, the existing conventional options are not efficient or effective for most users of devices, especially for smaller devices, such as smartphones and smaller tablet computing devices. For instance, the existing conventional options are at times messy and hard to access depending on the size of the device screen. As such, navigating and entering the requested data or information is much more tedious and cumbersome as well. As an example, an 8"×11" paper size is not meant to be displayed and used in a 2.6"×5.4" screen. In contrast, the focused screen data field presentation system and method for entry of data associated with an electronic form into a QES of the present disclosure provides a new streamlined method of entry with focused screens which supersedes these old traditional methods of form entry which are based on traditional layouts and designs.

The focused screen data field presentation system and method for entry of data associated with an electronic form into a QES of the present disclosure may be comprised of the following elements. This list of possible constituent elements is intended to be exemplary only and it is not intended that this list be used to limit the focused screen data field presentation system and method for entry of data associated with an electronic form into a QES of the present application to just these elements. Persons having ordinary skill in the art relevant to the present disclosure may understand there to be equivalent elements that may be substituted within the present disclosure without changing the essential function or operation of the focused screen data field presentation system and method for entry of data associated with an electronic form into a QES.

1. A selection of choices appearing at the exact location of the pressed action button, to further select derivative option of commands after selecting the first initial command by pressing the button (the derived command options depend on the prior selected command and prior data inputs of one or more completed fields in any prior entry screen)

2, The selection opens an entry screen, where a set of data is needed for entry (forms but in QES format)

3. A title, clearly shown before the form entry field, to mark the focus on what information is needed to be entered 4. A button that expands other sets of fields to enter data on based on the need to modify such data or not during the entry, if not expanded and modified, a default entry is used 5. A back button and a section ribbon to show current or previous fields which will show past titles when hovered over or persistent touch 6. A forward button, if the user goes back on his/her entry, when user has not entered data on this page, a next button in place of the forward button saves the data that is being entered on this page 7. A form entry field, where the data gets typed in, the font will gradually reduce if more information is entered to show maximum data visualization 8. The keyboard will show alphabet, or numerical popups on specific data fields, general keyboard if no specifics are required 9. Next button to head to the next form entry field 10. Submit button once at the end of the entry and all data requirements are fulfilled The focused screen data field presentation system and method for entry of data associated with an electronic form into a QES of the present disclosure generally works by overlaying the form entry system where a user would need to navigate the whole form unnecessarily as the system duplicates a paper based entry form. Instead the data entry method is evolved towards a singular user experience to counter this issue, effectively having a more focused, seamless and "new" entry method which will be natural as it replaces the need for "traditional" pen and paper viewing of forms, The logic would just be the systems additional checks to make the process even more seamless, such as not showing a forward button if the user is on the very recent field he/she is working on, which keyboard to show if the data field requires specific data such as numerical only data, what type of field entry is required to trigger which type of display for it and finally a submit button where the user is already on the last line of the entry. Small algorithms that makes the entry process more seamless and anticipatory to the user's flow.

To make the focused screen data field presentation system and method for entry of data associated with an electronic form into a QES of the present disclosure, a person may design, code, and build/deploy a mobile app for mobile devices or conventional computing device software application. The mobile app and/or software application may be designed and coded in a way that implements the method for entry of data associated with the electronic form into a QES of the present disclosure.

By way of example, FIG. 1 conceptually illustrates a block diagram of a focused screen data field presentation system 10. As shown in this figure, the focused screen data field presentation system 10 starts from a website/app block. The website/app includes any kind of software application or mobile app which can run on a computing device to allow a user to interact with and navigate to another location for form entry. The user is directed to the form entry from the website or software application. Thus, when the user chooses to navigate to form entry, a regular form is then displayed on the user's device. An example of a regular form is described below by reference to FIG. 2.

The regular form is displayed in its entirety on the user's computing device screen, regardless of design size of the form. When scaled to fit the screen of the user's device, form entry fields are very difficult to read and/or understand. However, the entry form is used in connection with the focused screen data field presentation system 10, the user can easily tap a location on screen that is associated with a certain area of the regular form. For example, the use may tap the screen at a location which corresponds to the top section of the first page of the regular form. When the user selects such a location, a sectional data separation module of the focused screen data field presentation system 10 performs a sectional data separation process (algorithm) to identify and separate different sections of the regular form and to identify and group questions in each section together.

In some other embodiments, the focused screen data field presentation system 10 automatically performs sectional data separation when the regular form is accessed by the user (or navigated to from the website or software application). Whether the user taps to select a starting section in which to aggregate and group questions of a section, or the focused screen data field presentation system 10 automatically separates multiple different sections of the regular form, the focused screen data field presentation system 10 then groups the questions of the section. The questions of the section are the data request fields as shown in the form in relation to that section.

In some embodiments, the focused screen data field presentation system 10 also performs a backend process of creating a sectional data structure or a data object (hereinafter referred to as "sectional data object structure") that encapsulates one or more questions as variables for the sectional data object structure. As shown in the block diagram of the focused screen data field presentation system 10 in FIG. 1, there are at least three questions associated with a particular section. While this is only an example, and a person of ordinary skill in the relevant art would understand that a different section may only have one question or two questions, or may have more than three questions, the example here serves as a typical scenario which is important for presentation at the user interface (UI) level/stage and also equally important for functional efficiency of the computing device which the user is using. Specifically, the generation and creating of sectional data object structures for each section (and only one section of questions at a time), and the subsequent storage of those sectional data object structures after the user inputs data for the group of questions for that section, allows the user's computing device to efficiently handle retrieval, presentation, transmission, and storage of any and all data input related to the entry form. More specifically, the user's realtime computing device hardware resources are optimized in terms of processing cycles (CPU processing stress) at runtime and random access memory (RAM) consumption at runtime. The user's persistent computing device hardware resources are also optimized in terms of long term, non-transitory and persistent data storage, specifically by way of the sectional data object structures that encapsulates data on a section-by-section basis for a given form, and associate all of the sectional data object structures of the given form together, as any one or more of linked connections between the sectional data object structures for a single form, within a superstructure that encapsulates a plurality of the sectional data object structures in a single form-based structure for the given form, etc.

Now, after the focused screen data field presentation system 10 performs sectional data separation and groups the question the given section, then the questions in that given section are displayed on the screen of the user's computing device. In some embodiments, the questions get displayed a page at a time. In some embodiments, a section may include multiple fields (questions) and may sort the questions for display of the fields (questions) in anticipation of the user performing data entry in the UI screen on the device. An example of question data sorting is described below by reference to FIG. 2. Also, examples of presenting the sorted questions from a section are described by reference to FIGS. 3, 5A, and 5B below.

In some embodiments, the questions of a given section are presented via the quick entry system user interface (UI) interaction. The quick entry system UI interaction can continue for any number of questions for the given section as needed. Furthermore, the quick entry system UI interaction can proceed in sequential or non-sequential fashion. For example, the questions can be presented in sequence with corresponding user input provided for each question, or alternatively, the user can drive the order of questions as needed (e.g., starting with the first question, moving to the second, then the third, then going back to the first question, and then moving ahead to the fifth question, and coming back to finish the group of questions in the section with the fourth question). Nevertheless, after the user cycles through the questions of the given section the focused screen data field presentation system 10, the focused screen data field presentation system 10 saves the data set in a sectional data object structure which is stored in a database. In some embodiments, the database is a persistent database that stores data on a permanent storage device of the user's computing device or in a cloud database. In some embodiments, the database is an in-memory database that encapsulates the user inputs for all of the questions of a particular section in a sectional data object structure in memory (RAM), and which later stores multiple sectional data object structures for multiple sections of questions of the form in a persistent database that is stored on a permanent storage device (such as a hard disk of the user's computing device or a cloud database storage device that is accessible to the computing device of the user).

In some embodiments, the focused screen data field presentation system 10 may revert to the website or the software application for quick data entry into the regular form based on the user's data entry inputs in response to the questions. Alternatively, or in conjunction, the focused screen data field presentation system 10 of some embodiments transfers the data input by the user to the form for processing, which may necessitate old form re-entry or may simply create a condition that allows for further processing of the form to skip one or more sections of questions, depending on the user-provided answers to one or more of the questions in a preceding section. Whatever the particular case for a given form, the focused screen data field presentation system 10 continues performing these steps until the form is completed.

To use the focused screen data field presentation system and method for entry of data associated with an electronic form into a QES of the present disclosure, a user will be able to navigate a form and enter data into the form effortlessly and seamlessly. Furthermore, the form is presented in sectional sets of questions that provide even more focused attention on the information that is required of the user, and allows the mobile app and/or software application to visually output the focused data requests/fields in a way that does not obfuscate, block, or otherwise misdirect the user. The backend data retrieval, after the user enters the data for the requested form fields, is stored for each section, and data structures for each section are generated in the backend system to replicate the identified sets of data request questions in each section. This will effectively provide a more seamless, efficient and focused approach to filling in information. It eliminates reluctance to use an entry system, and creates time efficiency, improving the system as a whole.

Figure 2:
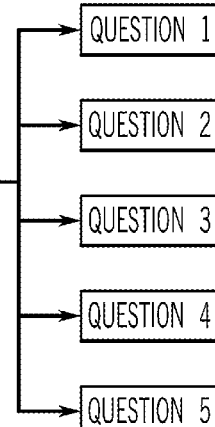
FIG. 2 conceptually illustrates an example of the focused screen data field presentation system in use while individual questions derived from a traditional form are presented electronically to a user.

By way of example, FIG. 2 conceptually illustrates an example of the focused screen data field presentation system in use while individual questions are sorted from a traditional form and are presented electronically to a user. As shown in this figure, the traditional form 20 includes several sections of a "City Development Application Form." The sections of the traditional form 20 are analyzed by the focused screen data field presentation system 10. Specifically, the sectional data separation module analyzes the traditional form 20 and sorts different groups of questions for the multiple sections of the form. In this example, the sorting 22 results in five "Questions" for five sections of the traditional form 20. Next, the quick entry system UI interaction occurs, by presenting UI screens for each set of questions related to each section in the traditional form 20.

Figure 3:
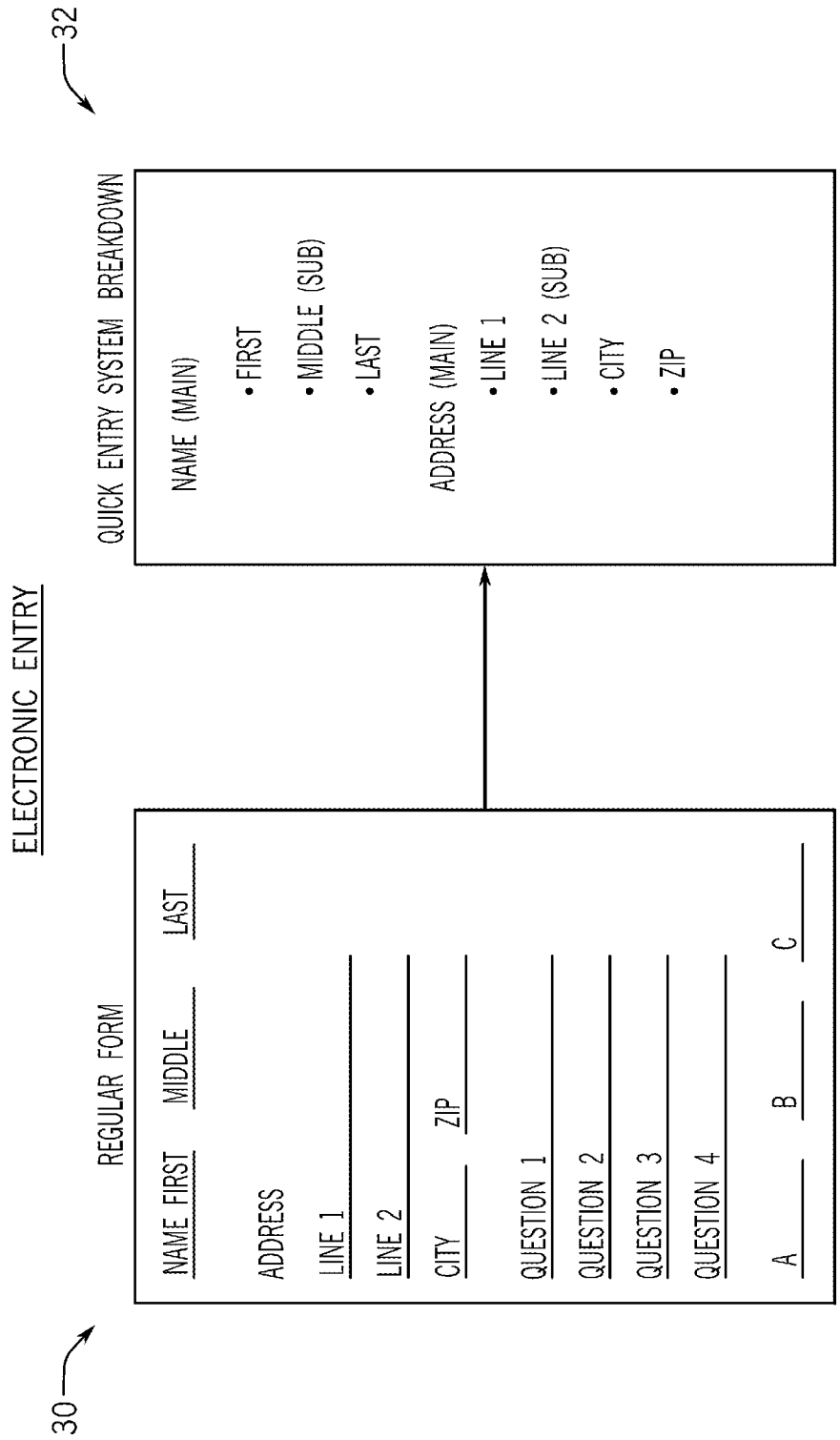
FIG. 3 conceptually illustrates an example of a mobile device presenting a section of form entry fields based on fields in a section of a traditional form.

Turning to an example of the quick entry system UI interaction, FIG. 3 conceptually illustrates an example of a LZ screen with a regular form view 30 and a quick entry system breakdown view 32 which is related to a section of the form with question fields in the section of the traditional form 20. As can be seen in these UI screens, the user can easily navigate through the required data input fields to complete that particular section of the traditional form 20.

Figure 4:
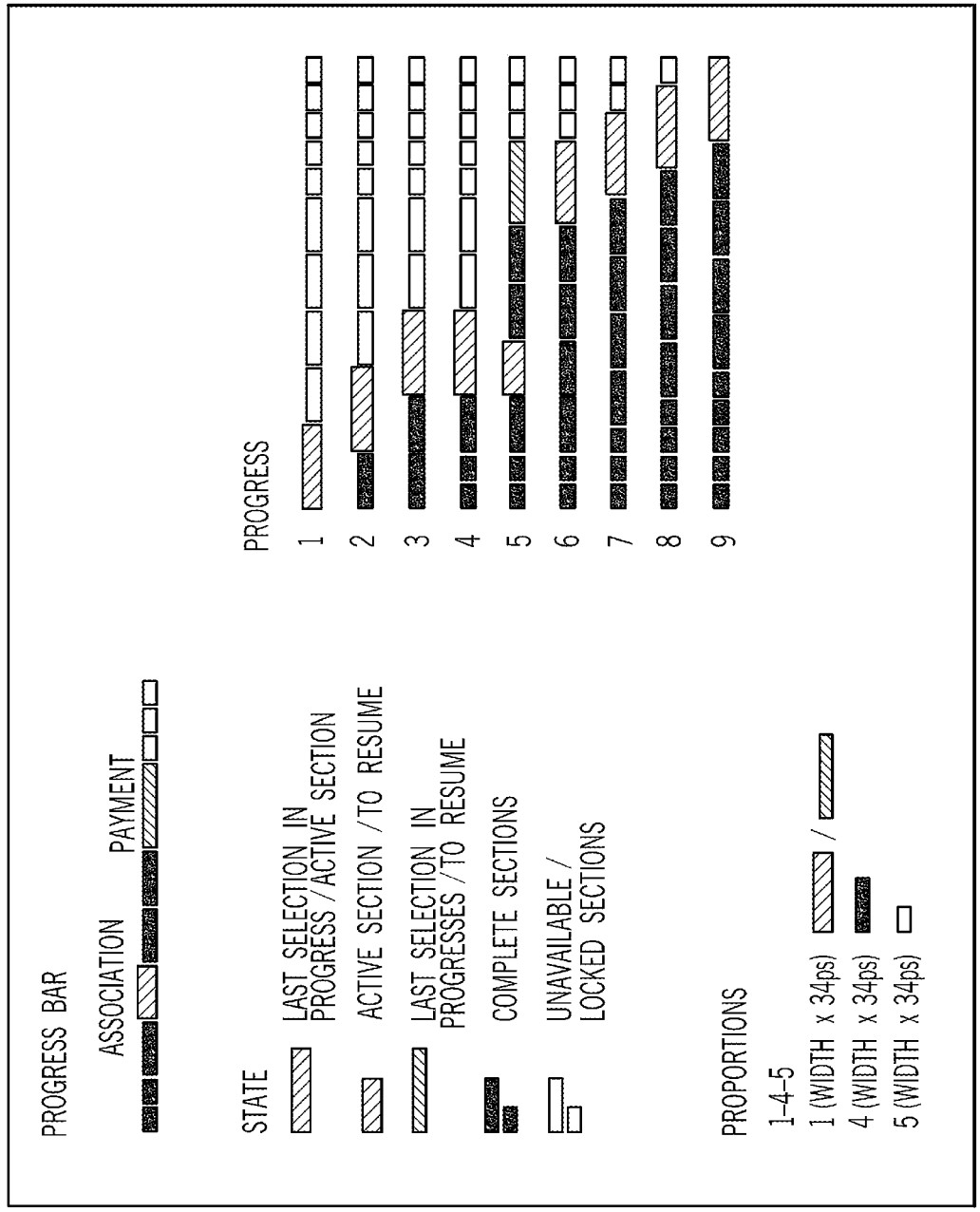
FIG. 4 conceptually illustrates a progress evaluation and efficiency metric screenshot provided by the focused screen data field presentation system in connection with a saved form that is partially completed, FIG. 5A conceptually illustrates examples of data entry fields of a section of a traditional form.

Now turning to another example, FIG. 4 conceptually illustrates a progress evaluation and efficiency metric UI screen 40 provided by the focused screen data field presentation system in connection with a saved form that is partially completed. The progress evaluation and efficiency metric UI screen 40 allows the user to easily save data before completing any given form, and then to come back into the focused screen data field presentation system 10 at any later time to complete the form. As shown, the progress bar gives the user enough information to understand how much remains to be completed for the given form. In this example, the "Association" section is presently active and the "Payment" section is the last section that was in progress and in need to be completed. Other sections remain to be started/completed in the form, but are not accessible now (until either or both of the "Association" and/or "Payment" sections are completed).

Figure 5A:
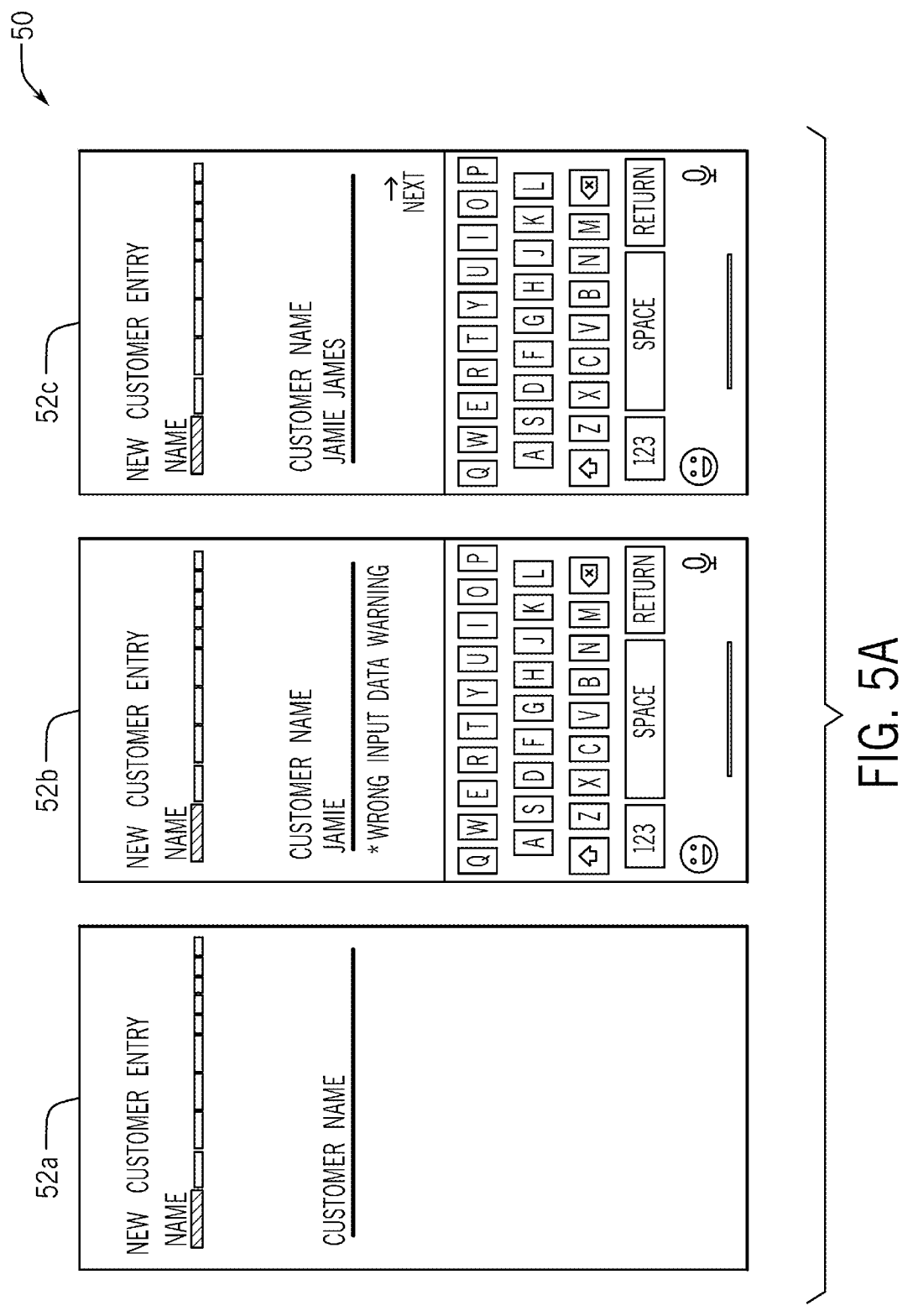

By way of example, FIG. 5A conceptually illustrates examples of data entry fields 50 of a section of a traditional form. As shown in this figure, the data entry fields 50 include a first screen 52a that is presented on a mobile device of a user. The first Iii screen 52a in this example has a title of "New Customer Entry" and presents a single field for the user to input the customer name. When the user inputs a name into the customer name field, a virtual keyboard is displayed to allow alpha-numeric data input by the user. As shown in the second UI screen 52b, the user has only input the customer name as "Jamie" with nothing more. This has triggered an error: "Wrong Input Data Warning". The error is triggered in this case because the system expected to receive a first name and a last name of the customer, and the mere entry of "Jamie" was not sufficient. However, the user corrects this in the third Iii screen 52c where "Jamie James" is shown in the customer name field and a "Next→" arrow is displayed upon entry of the proper customer name data.

Figure 5B:
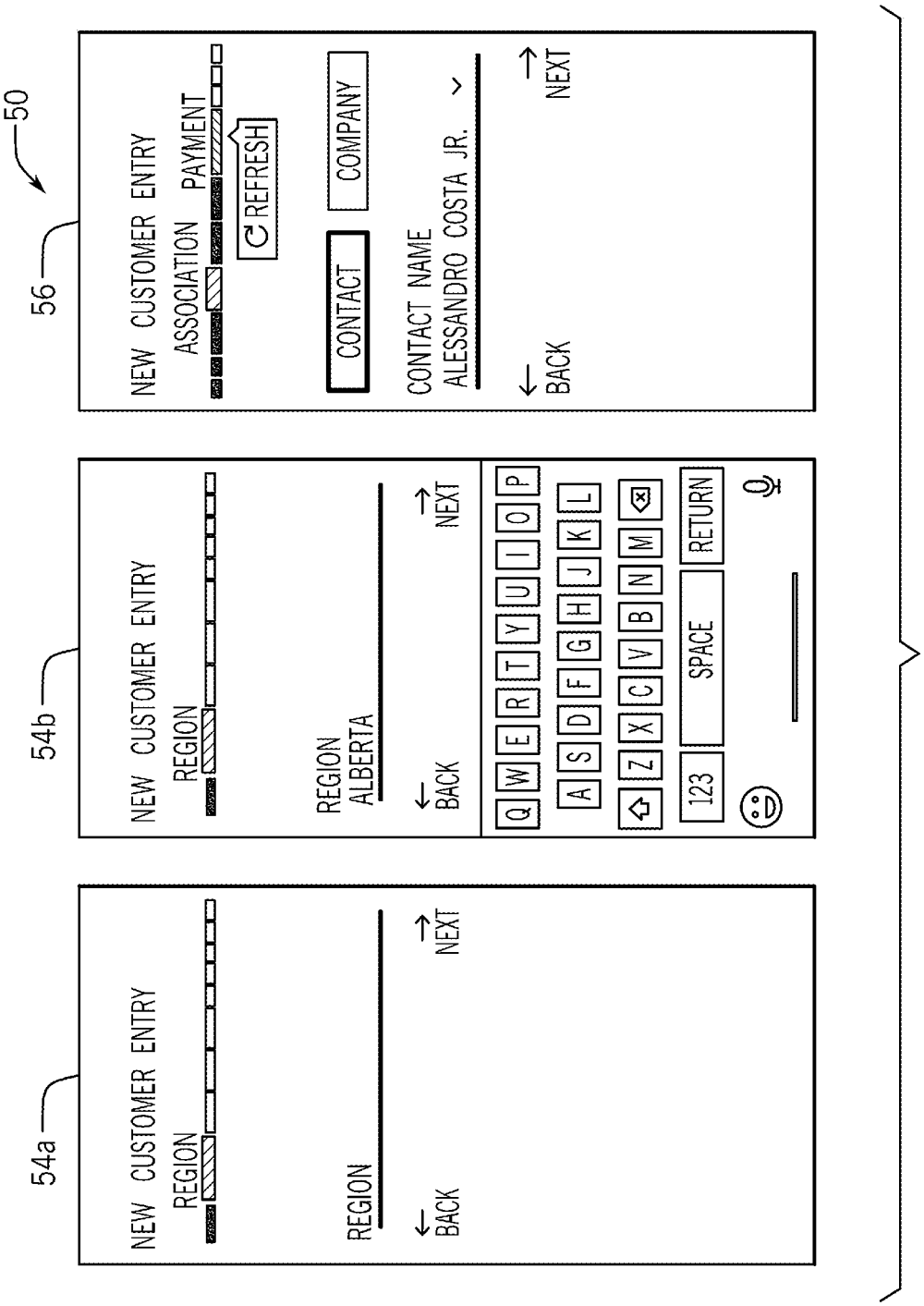
FIG. 5B conceptually illustrates some more examples of data entry fields of the section of the traditional form.

Now turning to FIG. 5B, which conceptually illustrates some more examples of data entry fields 50 of the section of the traditional form. Specifically, the data entry fields show a fourth UT screen 54a, a fifth UI screen 54b, and a sixth LI screen 56 for the "New Customer Entry" section. In the fourth UI screen 54a, a new data field is visually output: "Region". The user can select to go "←Back" or "Next→" as desired. As shown in the fifth UI screen 54b, the user has entered "Alberta" for the "Region" data entry field. Next, in the sixth IA screen 56, the user is presented with a "Contact Name" data entry field, to which the user inputs "Alessandro Costa Jr.". Also, the sixth UI screen 56 allows the user to specify a "Contact" or a "Company" to enter at this stage. In terms of the progress bar, the "Association" section either requires both a "Contact" and a "Company" or will allow the user to proceed if either one of a "Contact" or a "Company" is entered. Again, the sectional analysis forms a dependency chain that determines which data input constraints are considered mandatory and which are optional.

Additionally, the focused screen data field presentation system and method for entry of data associated with an electronic form into a QES of the present disclosure can be adapted for use in any data entry process required of a user in any kind of display not limited to a computer, tablet, or mobile device (e.g., smartphone), but to all display screens that would prompt the user for requested data entry. The whole philosophy of entry can be applied to any interaction that requires visual and tactile human input/interaction.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs, FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625, From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Figure 6:
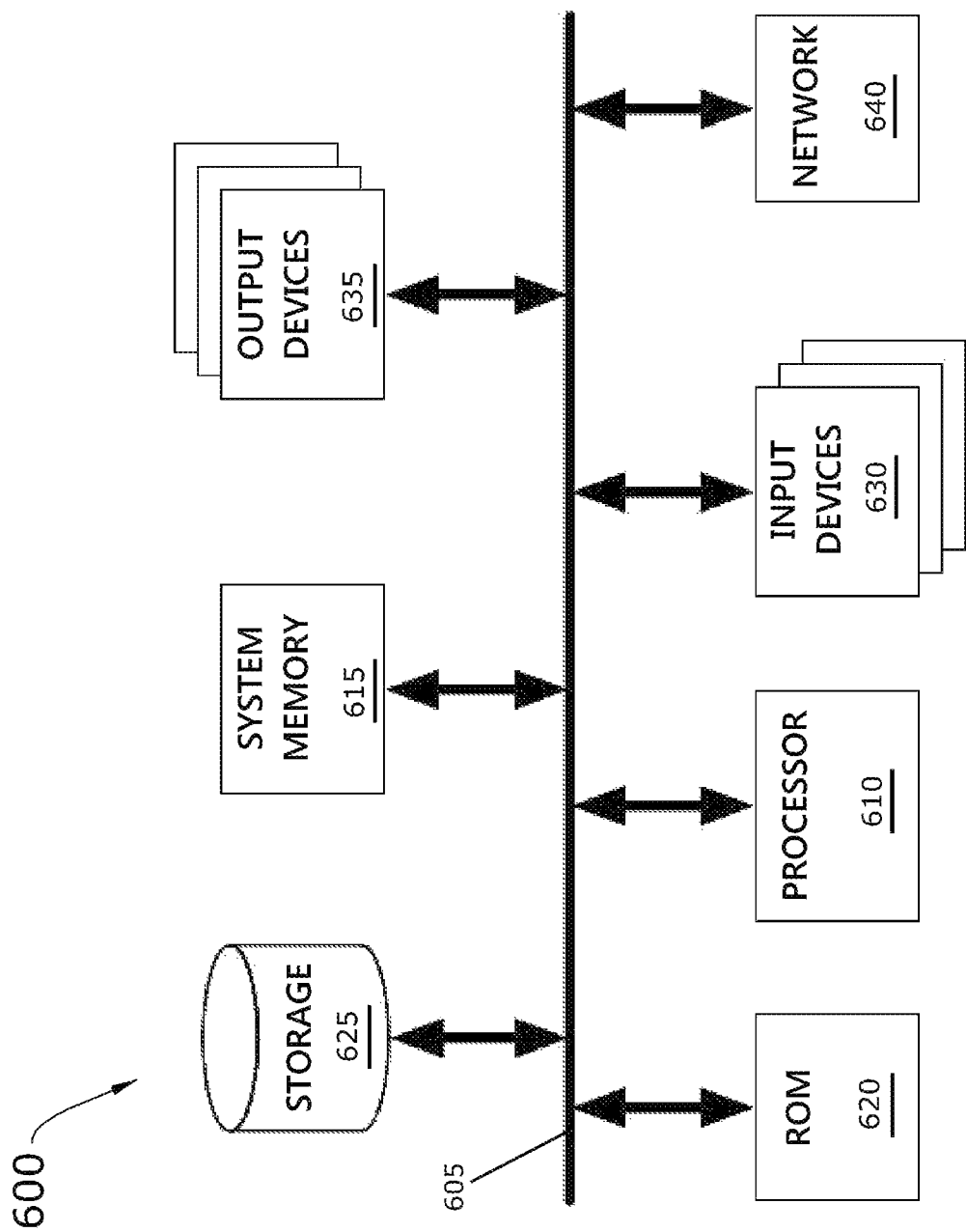
FIG. 6 conceptually illustrates an electronic system with which some embodiments of the invention are implemented.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a block diagram of a focused screen data field presentation system that performs a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A focused screen data field presentation system comprising:
   a computing device comprising a computing device processor and a permanent storage device that includes a focused screen data field presentation software application that allows a user to input data into an entry form in connection with a quick entry system (QES) by (i) tapping a portion of a screen associated with a section of a regular form on a computing device (ii) in response to the tapping, receiving a selection of the portion of a screen which corresponds to the section of the regular form from the user at the computing device, (iii) performing a sectional data separation process based on the tapping of the portion of the screen associated with the section of the regular form to identify and separate the section of the regular form into one or more different sections using a backend process to create a sectional data structure that encapsulates one or more questions associated with the selected section as variables, (iv) displaying a progress bar of the one or more different sections where the progress bar comprises displaying (i) a last section in progress/active section (ii) an active session to resume (iii) a last section in progress to resume, (iv) completed sections and (v) unavailable/locked sections and (iv) grouping the one or more variables in the one or more different sections; and
   an output device for displaying the one or more different sections on a user screen, each of the one or more different sections comprising a plurality of data input fields for the user to complete.

2. The focused screen data field presentation system of claim 1, wherein the user starts the focused screen data field presentation software application by opening the entry form.

3. The focused screen data field presentation system of claim 2, further comprising a sectional data separation module that performs the sectional data separation process.

4. The focused screen data field presentation system of claim 3, wherein the entry form includes one or more data input fields.

5. The focused screen data field presentation system of claim 1, wherein the focused screen data field presentation software application generates a user interface (UI) screen for each section in the one or more different sections.

6. The focused screen data field presentation system of claim 5, wherein the focused screen data field presentation software application visually outputs a particular UI screen for a particular section in the one or more different sections to allow the user to input data conforming to an expected type of data for the data input fields shown in the particular UI screen.

7. The focused screen data field presentation system of claim 6, wherein the focused
   screen data field presentation software application encapsulates the user input data associated with the particular UI screen in the sectional data object structure that is optimally saved in the RAM of the computing device while the user continues to input data associated with other sections of the entry form.

8. The focused screen data field presentation system of claim 7, further comprising a database, wherein the focused screen data field presentation software application stores the sectional data object structure and the user input data encapsulated in the sectional data object structure in the database.

9. The focused screen data field presentation system of claim 8, wherein the focused screen data field presentation software application stores a plurality of sectional data object structures and the user input data encapsulated in each sectional data object structure in the database.

10. The focused screen data field presentation system of claim 9, wherein the plurality of sectional data object structures correspond to a plurality of section of the entry form, each sectional data object structure encapsulating user input data associated with one or more data input fields corresponding a particular section.

11. A non-transitory computer-readable medium storing program code, the program code executable by a computing device to cause the computing device to:
receive a selection of a portion of a screen which corresponds to a section of a regular form from the user at the computing device;
perform a sectional data separation process to identify and separate the section of the regular form into one or more different sections using a backend process to create a sectional data structure that encapsulates one or more questions associated with the selected section as variables;
group the one or more variables in the one or more different sections;
display the one or more different sections on a user screen, each of the one or more different sections comprising a plurality of data input fields for the user to complete; and
display a progress bar of the one or more different sections where the progress bar comprises displaying (i) a last section in progress/active section (ii) an active session to resume (iii) a last section in progress to resume, (iv) completed sections and (v) unavailable/locked sections;
save data associated with the one or more different sections before completing the quick entry form; and
return at a later time to complete the quick entry form.

12. The non-transitory computer-readable medium of claim 11, wherein the user starts the focused screen data field presentation software application by opening the entry form.

13. The non-transitory computer-readable medium of claim 12, wherein a sectional data separation module performs the sectional data separation process.

14. The non-transitory computer-readable medium of claim 13, wherein the entry form includes one or more data input fields.

15. A method to present a quick entry form to a user, the method comprising:
receiving a selection of a portion of a screen which corresponds to a section of a regular form from the user at a computing device by tapping a portion of the screen corresponding to the section of the regular form;
performing, via the computing device, a sectional data separation process based on tapping the portion of the screen corresponding to the section of the regular form to identify and separate the section of the regular form into one or more different sections using a backend process to create a sectional data structure that encapsulates one or more questions associated with the selected section as variables;
grouping the one or more variables in the one or more different sections;
displaying a progress bar of the one or more different sections where the progress bar comprises displaying (i) a last section in progress/active section (ii) an active session to resume (iii) a last section in progress to resume, (iv) completed sections and (v) unavailable/locked sections; and
displaying the one or more different sections on a user screen, each of the one or more different sections comprising a plurality of data input fields for the user to complete.

16. The method of claim 15, wherein the user starts the focused screen data field presentation software application by opening the entry form.

17. The non-transitory computer-readable medium of claim 11, wherein the selection of a portion of a screen which corresponds to a section of a regular form from the user at a computing device is received based on tapping a portion of the screen corresponding to the section of the regular form.

18. The method of claim 15, further comprising: displaying a progress bar of the one or more different sections that where the progress bar comprises displaying (i) a presently active section, (ii) a section that was in progress and needs to be completed and (iii) a section that remains to be completed but is not currently accessible.

19. The method of claim 15, further comprising:
saving data associated with the one or more different sections before completing the quick entry form; and
returning at a later time to complete the quick entry form.

\* \* \* \* \*